US008706559B2

(12) United States Patent
Kimberg

(10) Patent No.: US 8,706,559 B2
(45) Date of Patent: Apr. 22, 2014

(54) METHODS AND SYSTEMS FOR ACTIVATING A CONTACTLESS TRANSACTION CARD

(75) Inventor: Deborah M. Kimberg, Chesterfield, MO (US)

(73) Assignee: MasterCard International Incorporated, Purchase, NY (US)

( * ) Notice: Subject to any disclaimer, the term of this patent is extended or adjusted under 35 U.S.C. 154(b) by 225 days.

(21) Appl. No.: 12/978,035

(22) Filed: Dec. 23, 2010

(65) Prior Publication Data

US 2012/0166314 A1    Jun. 28, 2012

(51) Int. Cl.
*G06Q 30/00* (2012.01)

(52) U.S. Cl.
USPC .......................................................... 705/26.1

(58) Field of Classification Search
CPC ........................................... G06Q 60/06–60/08
USPC ..................................... 705/26–27, 26.1–27.2
See application file for complete search history.

(56) References Cited

U.S. PATENT DOCUMENTS

| 7,228,155 | B2 | 6/2007 | Saunders |
| 7,832,646 | B1 | 11/2010 | Leason |
| 2002/0052780 | A1 | 5/2002 | Landesmann |
| 2002/0117541 | A1* | 8/2002 | Biggar et al. ................. 235/379 |
| 2009/0069049 | A1 | 3/2009 | Jain |
| 2009/0070272 | A1 | 3/2009 | Jain |
| 2009/0099964 | A1* | 4/2009 | Calderon Gonzalez ........ 705/41 |
| 2009/0309254 | A1* | 12/2009 | Pugh et al. ..................... 264/138 |

OTHER PUBLICATIONS

Chang, A.Y., Dwen-Ren, T., Chang-Lung, T. & Yong-Jiang, L., "An Improved Certificate Mechanism for Transactions Using Radio Frequency Identification Enabled Mobile Phone" (Security Technology 2009, 43$^{rd}$ Annual Int'l Carnahan Conference on Digital Object Identifier, 2009, pp. 36-40).*
PCT/US 11/67138, International Search Report and Written Opinion dated Apr. 26, 2012 (7 pages).

* cited by examiner

*Primary Examiner* — Jason Dunham
*Assistant Examiner* — Ethan D Civan
(74) *Attorney, Agent, or Firm* — Armstrong Teasdale LLP

(57) ABSTRACT

A method and system for issuing and activating a contactless transaction card is provided. The method uses a server system coupled to a database. The method includes providing a promotional transaction card including a proof of purchase identifier to a consumer, receiving a request message for ordering a contactless transaction card for the consumer wherein the request message includes the proof of purchase identifier and consumer registration data, validating the request message, issuing an inactive contactless transaction card to the consumer including a product identifier and an activation number, storing the product identifier and the activation number in the database, receiving the product identifier and the activation number from a client computer system, and activating the inactive contactless transaction card after the server system verifies that the received product identifier and activation number match the stored product identifier and activation number.

23 Claims, 7 Drawing Sheets

METHODS AND SYSTEMS FOR ACTIVATING A CONTACTLESS TRANSACTION CARD

BACKGROUND OF THE INVENTION

This invention relates generally to activating a contactless transaction card and, more particularly, to network-based methods and systems for issuing and activating a contactless transaction card for use by a cardholder in processing payment transactions.

Historically, the use of "charge" cards for consumer transaction payments was at most regional and based on relationships between local credit issuing banks and various local merchants. The payment card industry has since evolved with the issuing banks forming associations (e.g., MasterCard®) and involving third party transaction processing companies (e.g., "Merchant Acquirers") to enable cardholders to widely use charge cards at any merchant's establishment, regardless of the merchant's banking relationship with the card issuer.

For example, FIGS. 1 and 2 of the present application show exemplary payment-by-card systems. FIG. 1 shows an exemplary private label payment card system, and FIG. 2 shows an exemplary multi-party payment card industry system for enabling payment-by-card transactions in which the merchants and issuer do not need to have a one-to-one special relationship. Various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. The special or customized issuer-merchant relationships often require direct communications between the parties for transaction authorization and/or clearing (e.g., for financial transactions). Further, the issuer may be required to maintain back office processes to manage the financial aspects of these special or customized relationships. Alternatively, the issuers may exploit communications through merchant acquirers to facilitate indirect communications with the merchants.

There are also scenarios in the payment-by-card industry where the card issuer does not have a special or customized relationship with a specific merchant, or group of merchants. These types of transactions are typically processed using a multi-party payment card system similar to the one shown in FIG. 2.

Traditional card account payment environments involve a merchant-controlled point of interaction (POI). Traditional points of interaction include point of sale devices, access through a merchant website, and interaction through a merchant telephone to initiate the authorization request. Collectively, these traditional points of interaction might be referred to as a merchant environment. For all interactions within this environment, an account number associated with a cardholder's financial transaction card is entered into the specific merchant's environment in order to conduct the transaction and/or obtain an authorization.

The specific cardholder interactions could include the cardholder giving his financial transaction card to a merchant to swipe or key into the merchant point of sale device, the merchant initiating a telephone call and entering the account number through interactive voice or through the telephone keypad, the cardholder himself swiping his card into the merchant's point of sale device, or the merchant or cardholder entering the account number into the merchant's website. These types of transaction cards are sometime referred to as contact transaction cards since these cards required contact (i.e., swiping) with the merchant point-of-sale device. Payments for approved transactions are managed with the issuer or merchant's acquirer based on the specific card payment network or closed loop environment.

However, transaction cards and merchant POIs have evolved over the years to now include what are sometimes referred to as "contactless" transaction cards. These contactless transaction cards may include a transaction card having contactless technology, a key fob programmed with contactless technology, or a mobile phone programmed with contactless technology. Such contactless transaction cards are able to communicate with a merchant's contactless point-of sale device. For example, MasterCard® has a service called MasterCard PayPass®, which is a "contactless" way to pay a merchant. A simple tap of your contactless card, key fob, or mobile phone at the merchant's contactless point-of-sale device (or placing the contactless card in close proximity to the POS device) is all it takes to pay at checkout. The contactless card is capable of wirelessly transmitting account data to the point-of-sale device.

Although contactless transaction cards are convenient for consumers to use and carry, the issuance of these contactless transaction cards has been somewhat limited. The expense associated with an issuer issuing these contactless cards to replace an existing contact transaction card and the difficulty in activating these cards by a consumer are at least two reasons why these cards have seen limited circulation.

Accordingly, it would be beneficial to have a method and system for facilitating the issuance and activation of contactless transaction cards to consumers. The method and system would help reduce costs incurred by the issuer when issuing these cards, and would make activating these cards by the cardholder easier.

BRIEF DESCRIPTION OF THE INVENTION

In one embodiment, a computer-based method for issuing and activating a contactless transaction card is provided. The method uses a server system coupled to a database. The server system is in communication with a client computer system. The method includes providing a promotional transaction card including a proof of purchase identifier to a consumer, receiving a request message from the client computer system for ordering a contactless transaction card for the consumer wherein the request message includes the proof of purchase identifier and consumer registration data, validating the request message, issuing an inactive contactless transaction card to the consumer including a product identifier and an activation number associated with the contactless transaction card, storing the product identifier and the activation number in the database, receiving the product identifier and the activation number from the client computer system for the inactive contactless transaction card, and activating the inactive contactless transaction card after the server system verifies that the received product identifier and activation number match the stored product identifier and activation number.

In another embodiment, a computer system for issuing and activating a contactless transaction card is provided. The computer system including a database for storing data, and a computer device having a processor in communication with the database. The computer device is programmed to transmit a promotional transaction card with a proof of purchase identifier to a consumer via a consumer computer, receive a request message from the consumer computer for ordering a contactless transaction card wherein the request message includes the proof of purchase identifier and consumer registration data, validate the request message wherein an inactive contactless transaction card including a product identifier is provided to the consumer after the request message is validated, transmit an activation number associated with the inactive contactless transaction card to the consumer computer, store the product identifier and the activation number in the database, receive the product identifier and the activation number from the consumer computer, and activate the inactive contactless transaction card after verifying that the received product identifier and activation number match the stored product identifier and activation number.

In another embodiment, a computer system for issuing and activating a contactless transaction card is provided. The computer system including a database for storing data, and a computer device having a processor in communication with the database. The computer device is programmed to receive a request message including a proof of purchase identifier and consumer registration data from a consumer computer for ordering a contactless transaction card, validate the request message wherein an inactive contactless transaction card including a product identifier is provided to the consumer upon validation, transmit an activation number associated with the inactive contactless transaction card to the consumer computer, store the product identifier and the activation number in the database, receive the product identifier and the activation number from the consumer computer, and activate the inactive contactless transaction card after verifying that the received product identifier and activation number match the stored product identifier and activation number.

In another embodiment, one or more computer-readable media having computer-executable instructions embodied thereon is provided. The computer-executable instructions are executed by a computer device. The computer-executable instructions cause the computer device to transmit a promotional transaction card to a consumer via a consumer computer including a proof of purchase identifier, receive a request message from the consumer computer for ordering a contactless transaction card for the consumer wherein the request message includes the proof of purchase identifier and consumer registration data, validate the request message wherein an inactive contactless transaction card including a product identifier is provided to the consumer after the request message is validated, transmit an activation number associated with the inactive contactless transaction card to the consumer, store the product identifier and the activation number in a memory device, receive the product identifier and the activation number from the consumer computer, and activate the inactive contactless transaction card after verifying that the received product identifier and activation number match the stored product identifier and activation number.

BRIEF DESCRIPTION OF THE DRAWINGS

FIG. 1 is a schematic diagram of an exemplary private label card account payment environment that includes a point of interaction controlled by a private label merchant, a card issuer or issuing bank, and a transaction processor interconnecting the point of interaction and card issuer.

FIG. 2 is a schematic diagram illustrating an exemplary multi-party payment card industry system for enabling ordinary payment-by-card transactions in which merchants and card issuers do not necessarily have a one-to-one relationship.

FIG. 3 is a simplified block diagram of an exemplary payment card system with a contactless transaction card in accordance with one embodiment of the present invention.

FIG. 4 is an expanded block diagram of an exemplary embodiment of a server architecture of a payment card system with a contactless transaction card in accordance with one embodiment of the present invention.

FIG. 5 is a block diagram of an exemplary embodiment of a user computer device as shown in FIGS. 3 and 4.

FIG. 6 is a block diagram of an exemplary embodiment of a server computer device as shown in FIGS. 3 and 4.

FIG. 7 is a flow chart showing an exemplary process of issuing and activating a contactless transaction card using the payment card system shown in FIGS. 3 and 4.

DETAILED DESCRIPTION OF THE INVENTION

Figure 1:
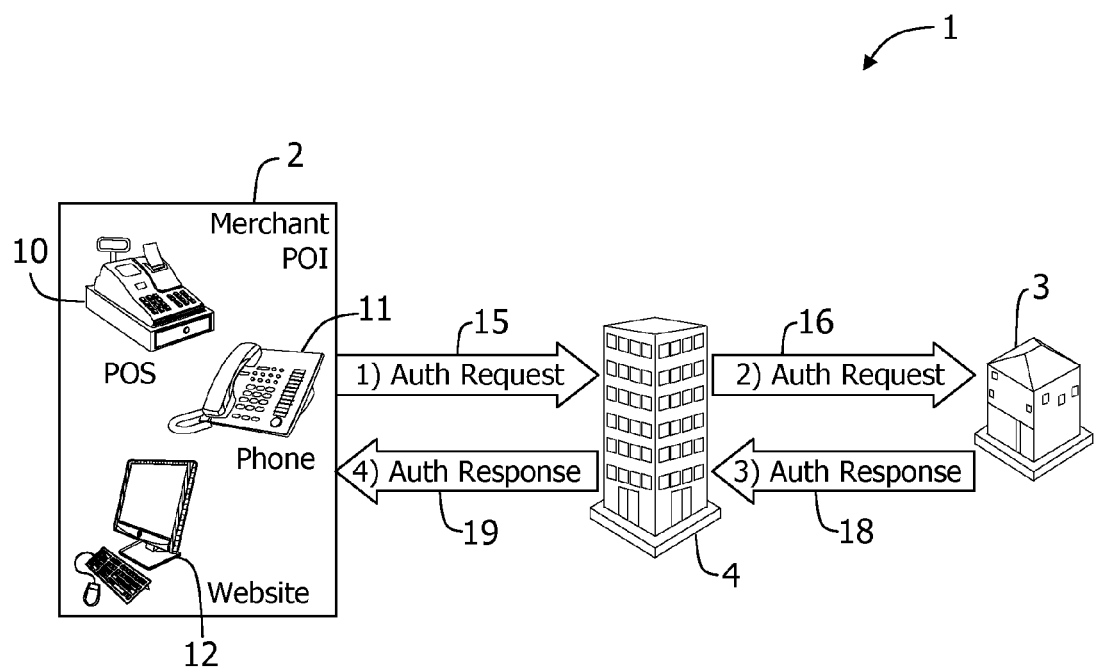
FIGS. 1-7 show exemplary embodiments of the methods and systems described herein.

Embodiments of the methods and systems described herein facilitate issuance and activation of contactless transaction cards. A contactless transaction card may take the form of a typical payment card but with contactless technology, an NFC (Near Field Communication) sticker, a key fob, a SIM (Subscriber Identity Module) card, or a mobile phone (smart phone) device wherein each of these devices includes the contactless technology which includes an embedded computer chip and a radio frequency antenna. The contactless technology enables these devices to wirelessly transmit account data to the merchant's point-of-sale (POS) device when these contactless transaction devices are positioned in close proximity to the POS device. The POS device captures the account data associated with the contactless transaction card and combines it with purchase data associated with the item(s) being purchased by the cardholder from the merchant. At least some of the account data and purchase data are combined by the POS device to form transaction data, which is transmitted by the POS device to the interchange network as part of an authorization request message.

The methods and systems described herein facilitate issuance and activation of these contactless transaction cards (e.g., a typical payment card, an NFC sticker, a key fob, a SIM card, or a mobile phone (smart phone) device with contactless technology). The method includes providing a promotional transaction card to a consumer. The promotional transaction card is essentially an item that is capable of displaying a unique proof of purchase identifier and instructions for ordering a contactless transaction card. For example, a promotional card could include a piece of paper enclosed within an envelope with the proof of purchase identifier and the instructions printed on the paper for instructing the consumer on accessing a website or telephone number for ordering a contactless transaction card. In addition, the promotional card may also include an additional proof of purchase identifier (second proof of purchase identifier) that is provided to the consumer at the point of purchase. For example, the register receipt could include the second proof of purchase identifier that the consumer would need to use to verify their purchase of the card to the payment system.

In another embodiment, the promotional card is electronically provided to the consumer. For example, the promotional card could be an email, an electronic file, or a link on a website communicated to the consumer wherein the email/file/website includes at least one of the proof of purchase identifier, instructions on how to order a contactless transaction card, and a link to a website for ordering a contactless transaction card.

After the consumer receives the promotional transaction card, the consumer follows the instructions on the promotional card such as accessing a card ordering website identified on the promotional card via a client computer device and entering the proof of purchase identifier displayed on the promotional card (and enter the second proof of purchase identifier if provided) along with registration data. The registration data may include information relating to an existing contact-style transaction card assigned to the consumer. The registration data is entered by the consumer into the card ordering website and includes information associated with the existing contact-style transaction card such as an account number, an expiration date, a CVC2 code, a name, an address, a phone number, an email address, etc. In another embodiment, the registration data relates to a new transaction card account for the consumer. In other words, at the same time the consumer is ordering a contactless transaction card, the consumer is also requesting a new transaction card account with the payment server system.

The card ordering website captures the proof of purchase identifier and the registration data, and communicates this information with a payment server system. The payment server system searches its database to determine whether the proof of purchase identifier is valid. If valid, the payment server system using, at least in part, the registration data: (i) performs a card account verification to verify the consumer is associated with the existing card account (e.g., address match, CVC2 comparison, etc.); and (ii) determines whether the existing account assigned to the consumer is approved for a contactless transaction card. If so, the payment server system transmits a message that is displayed on the card ordering website via the client system advising the consumer that the consumer's request has been approved and a contactless transaction card will be forwarded to the consumer within a predetermined period of time. If the payment server system determines that the consumer account is not approved for a contactless card, the payment server system transmits a message that is displayed on the card ordering website via the client system advising the consumer that the consumer's request has been denied and the consumer will not be receiving a contactless transaction card.

In one embodiment, the promotional transaction card is provided to the consumer at no charge. The consumer is then charged for the issuance of the contactless transaction card after the payment server system confirms that the consumer account is approved for a contactless transaction card. The existing account assigned to the consumer could be automatically charged by the payment server system upon approval of the issuance of the contactless transaction card. In another embodiment, the consumer pays for the promotional card at the time of receiving it. Thus, the consumer purchases the promotional card before accessing the card ordering website. In this case, it is likely that it would be predetermined that the consumer's existing account is eligible for a contactless transaction card.

After transmitting approval of the issuance of a contactless transaction card for the consumer and confirming payment of the fee associated with issuing the contactless transaction card, the payment server system transmits an order message to a vendor engaged by the provider of the payment system or to the issuer of the card who will be responsible for providing the card to the consumer. The vendor having been engaged by the payment system provider to provide contactless transaction cards to consumers, wherein the contactless transaction cards are programmed with the registration data of the consumers. In other words, the vendor is responsible for having a contactless transaction card programmed with the registration data of the consumer, wherein the registration data is provided to the vendor in the order message. After the contactless transaction card is programmed with the consumer's registration data, the contactless transaction card is shipped to the consumer in a non-activated mode. The inactive contactless transaction card includes a unique product identifier.

The payment server system stores the product identifier in the database. The payment server system transmits an email to the consumer advising the consumer that their contactless transaction card has been shipped to them, and provides the consumer with a unique activation number for activating the consumer's contactless transaction card. The activation number is also stored in the payment system database.

Upon receiving the contactless transaction card, the consumer either calls a telephone number provided by the payment system provider or accesses the card ordering website via the client system to activate the contactless transaction card. In the case of accessing the card ordering website, the consumer enters the product identifier associated with the contactless card and the unique activation number, which are then transmitted to the payment system. The payment system searches its database to determine that the product identifier and the activation number are both associated with the contactless card sent to the consumer. If the data is verified, the payment system activates the contactless transaction card. The consumer is then able to use the contactless transaction card at merchants set up for processing such contactless transaction cards. If the data is not verified, then the contactless transaction card is not activated.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) providing a promotional transaction card to a consumer, wherein the promotional transaction card includes a proof of purchase identifier and a card ordering website for ordering a contactless transaction card; b) accessing the card ordering website via a client computer device and entering a request message including the proof of purchase identifier from the promotional card and registration data, wherein the registration data includes information relating to at least one of an existing transaction card account assigned to the consumer including information such as an account number, an expiration date, a CVC2 code, a name, an address, a phone number, an email address, etc., and a new transaction card account; c) receiving, at a payment server system, the request message including the proof of purchase identifier and the registration data from the client computer device; d) searching a database in communication with the payment server system to determine whether the proof of purchase identifier is valid; e) if valid, the payment server system then determines, based at least in part on the registration data, whether the consumer account is approved for a contactless transaction card; f) if the consumer account is approved for a contactless transaction card, the payment server system charges the consumer account an issue fee for issuing the contactless transaction card to the consumer (unless the consumer paid the fee at the time of receiving the promotional card), and transmits a response message to the client system advising the consumer that the request message has been approved and a contactless transaction card will be forwarded to the consumer within a predetermined period of time; g) transmitting an order message from the payment server system to a vendor engaged to provide contactless transaction cards to consumers, wherein the order message includes the registration data for programming the contactless transaction card; h) providing an inactive contactless transaction card to the consumer with a product identifier, the inactive contactless transaction card programmed with the registration data; i) storing the product identifier and an activation number in the database, the activation number for activating the inactive contactless transaction card; j) transmitting an email from the payment server system to the client computer device with the activation number; k) receiving the product identifier associated with the inactive contactless card and the activation number, and determining that the product identifier and the activation number are both associated with the inactive contactless card sent to the consumer; and l) activating the inactive contactless transaction card if the data is verified.

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the following: a cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed-loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
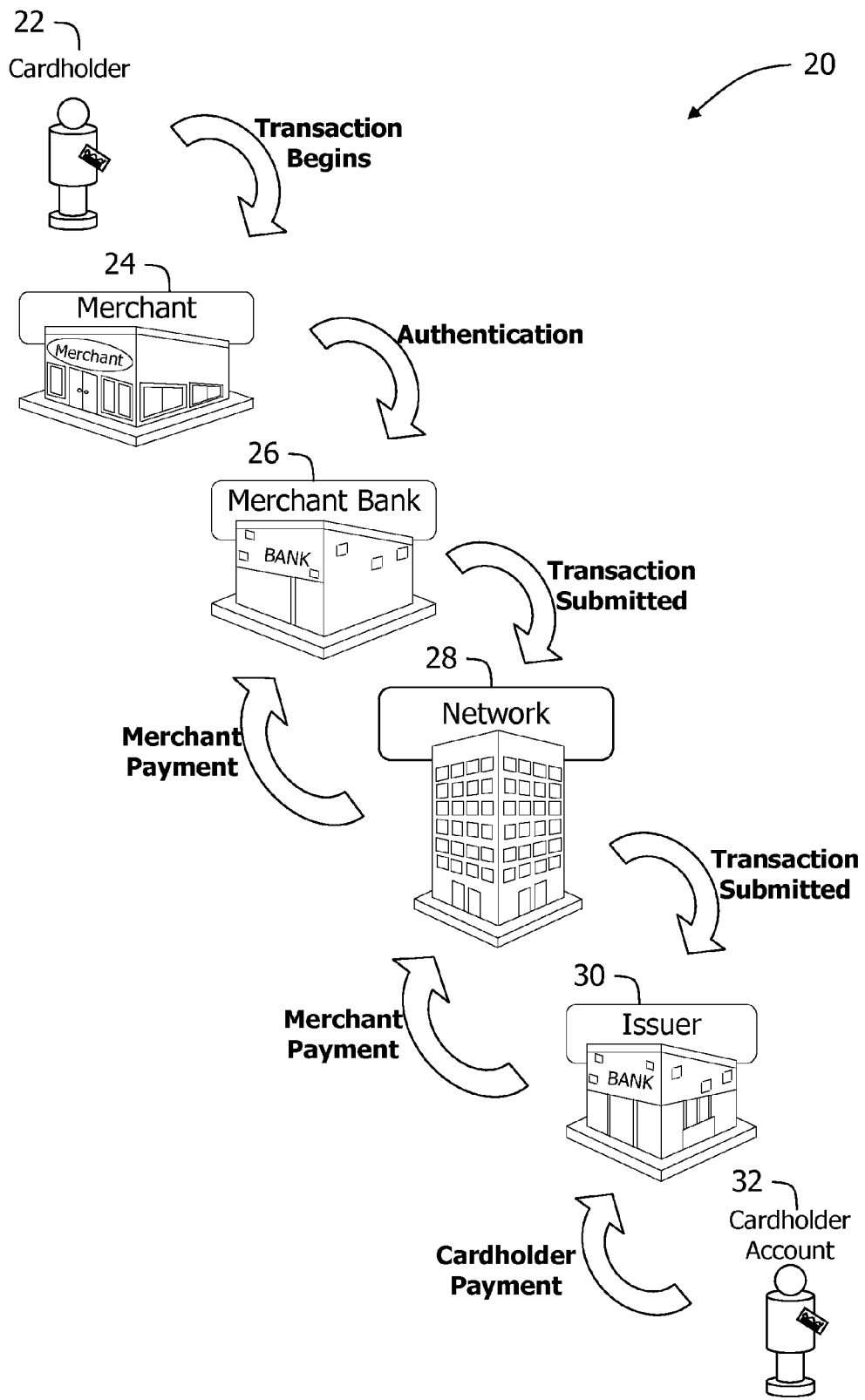

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed in FIGS. 1 and 2 may include credit cards, debit cards, and prepaid cards. As discussed in FIGS. 1 and 2, these transaction cards are contact transaction cards since these cards require contact (i.e., swiping) with the merchant point-of-sale device. However, it should be noted that the authorization process, the clearing process, and the settlement process as described in FIGS. 1 and 2 is essentially the same whether the transaction is initiated by a contact transaction card or a contactless transaction card as discussed below.

Figure 3:
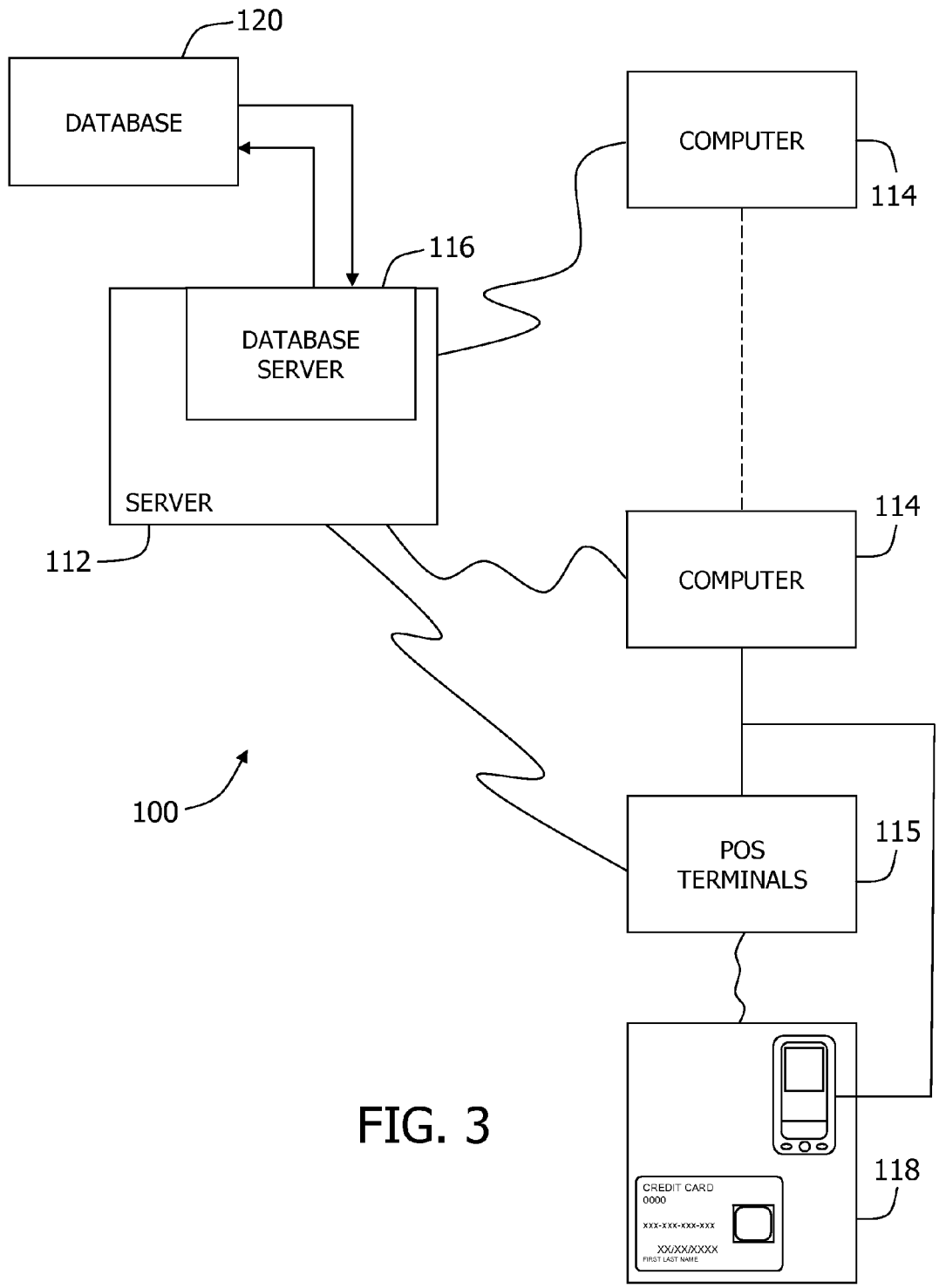

FIG. 3 is a simplified block diagram of an exemplary payment card system 100 in accordance with one embodiment of the present invention. System 100 is a payment card system, which can be utilized by account holders as part of (i) a process of issuing and activating a contactless transaction cards for later use in purchasing goods and/or services from a merchant, or (ii) a process of initiating an authorization request associated with one of the contactless transaction cards and performing a transaction as described below.

More specifically, in the example embodiment, system 100 includes a server system 112, which is a type of computer system, and a plurality of client sub-systems (also referred to as client systems 114) connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card. In the example embodiment, POS terminals 115 include contactless transaction card technology which enables terminals 115 to communicate with a contactless transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store account data including at least one of a cardholder name, a cardholder address, an account number, and other account identifier. Database 120 may also store merchant data including a merchant identifier that identifies each merchant registered to use the payment card network, and instructions for settling transactions including merchant bank account information. Database 120 may also store purchase data associated with items being purchased by a cardholder from a merchant, and authorization request data.

System 100 also includes at least one contactless transaction card 118, which is configured to communicate with at least one of POS terminal 115. In the exemplary embodiment, contactless transaction card 118 is associated with or controlled by a cardholder making a purchase using the contactless transaction card 118 and payment card system 100. Contactless transaction card 118 may include a transaction card having contactless technology, an NFC (Near Field Communication) sticker, a key fob, a SIM (Subscriber Identity Module) card, or a mobile phone (smart phone) device wherein each of these devices includes the contactless technology. Such contactless transaction cards are able to communicate with a merchant's contactless point-of-sale device. The contactless technology includes an embedded computer chip and a radio frequency antenna that enable the transaction card 118 to wirelessly transmit account data to the merchant's point-of-sale (POS) device when the contactless transaction card 118 is positioned in close proximity to the POS device.

In the example embodiment, client systems 114 may be associated with a consumer/cardholder, an acquirer, and/or an issuer; POS terminal 115 may be associated with a merchant; contactless transaction card 118 is associated with the cardholder; and server system 112 may be associated with the interchange network.

Figure 4:
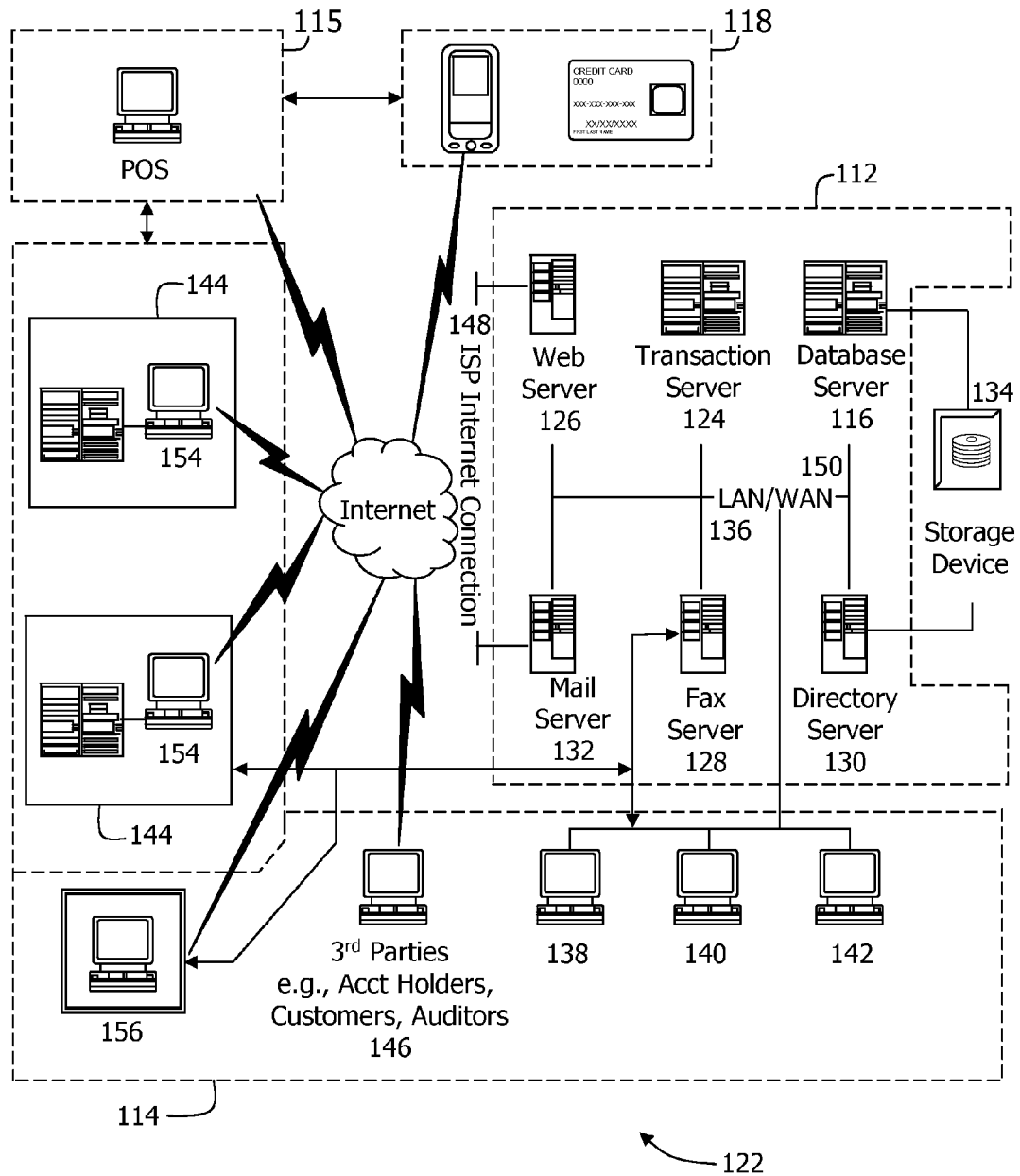

FIG. 4 is an expanded block diagram of an exemplary embodiment of a server architecture of a payment card system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, POS terminals 115, and contactless transaction card 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 5:
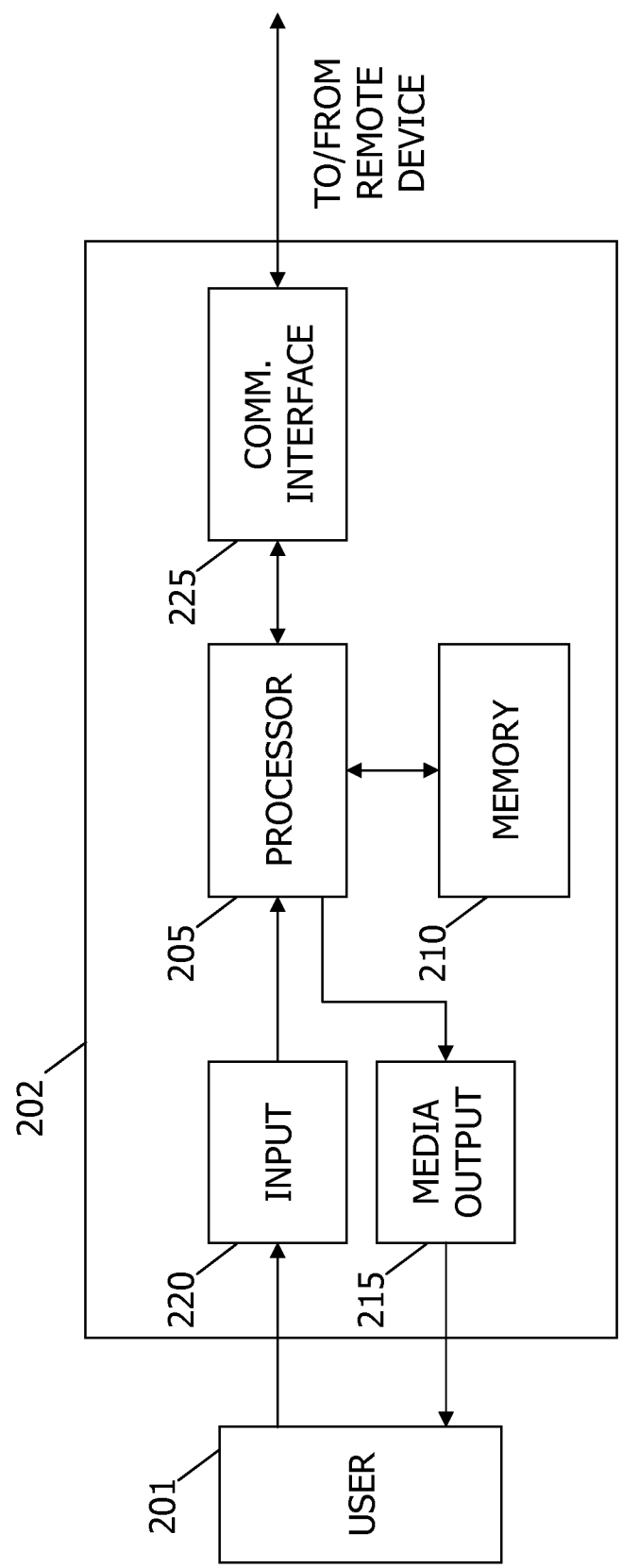

FIG. 5 illustrates an exemplary configuration of a user computer device 202 operated by a user 201. User computer device 202 may include, but is not limited to, client systems 114, 138, 140, and 142, POS terminal 115, workstation 154, and manager workstation 156 (shown in FIG. 4).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 6:
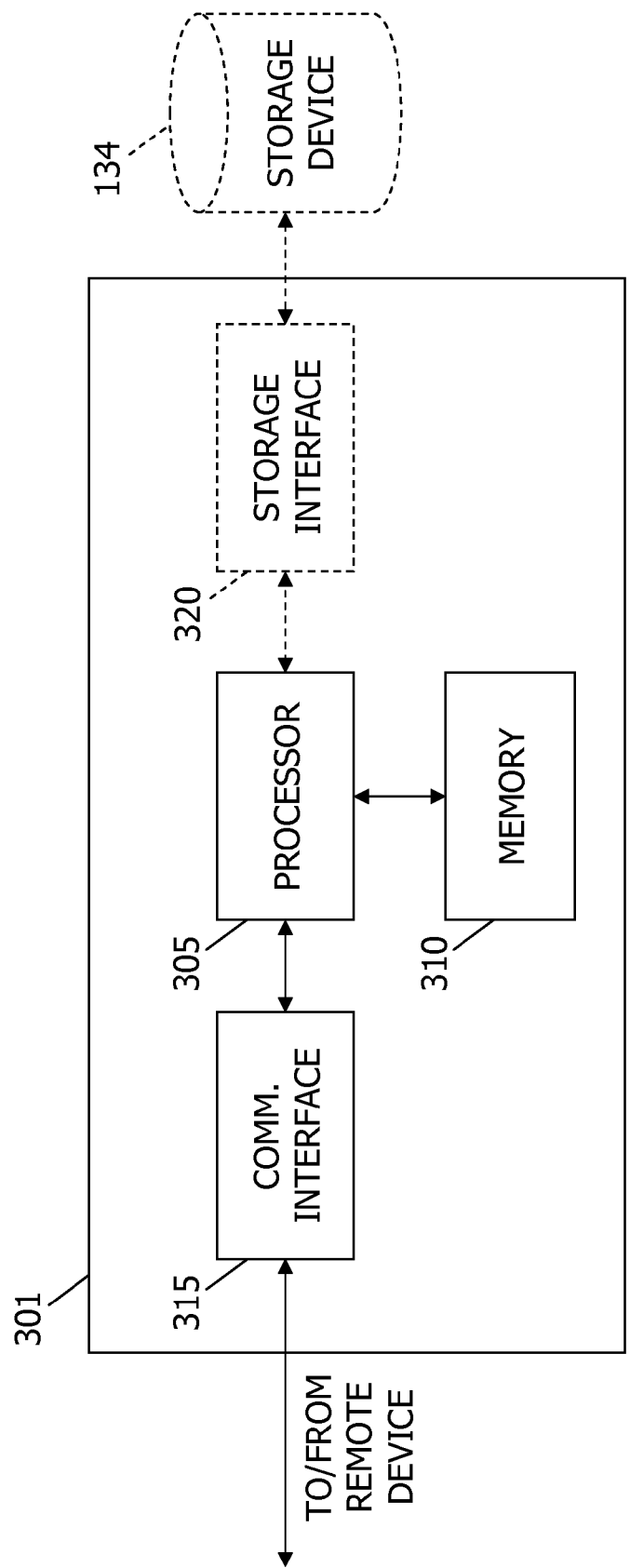

FIG. 6 illustrates an exemplary configuration of a server computer device 301 such as server system 112 (shown in FIGS. 3 and 4). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 via the Internet, as illustrated in FIGS. 3 and 4.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
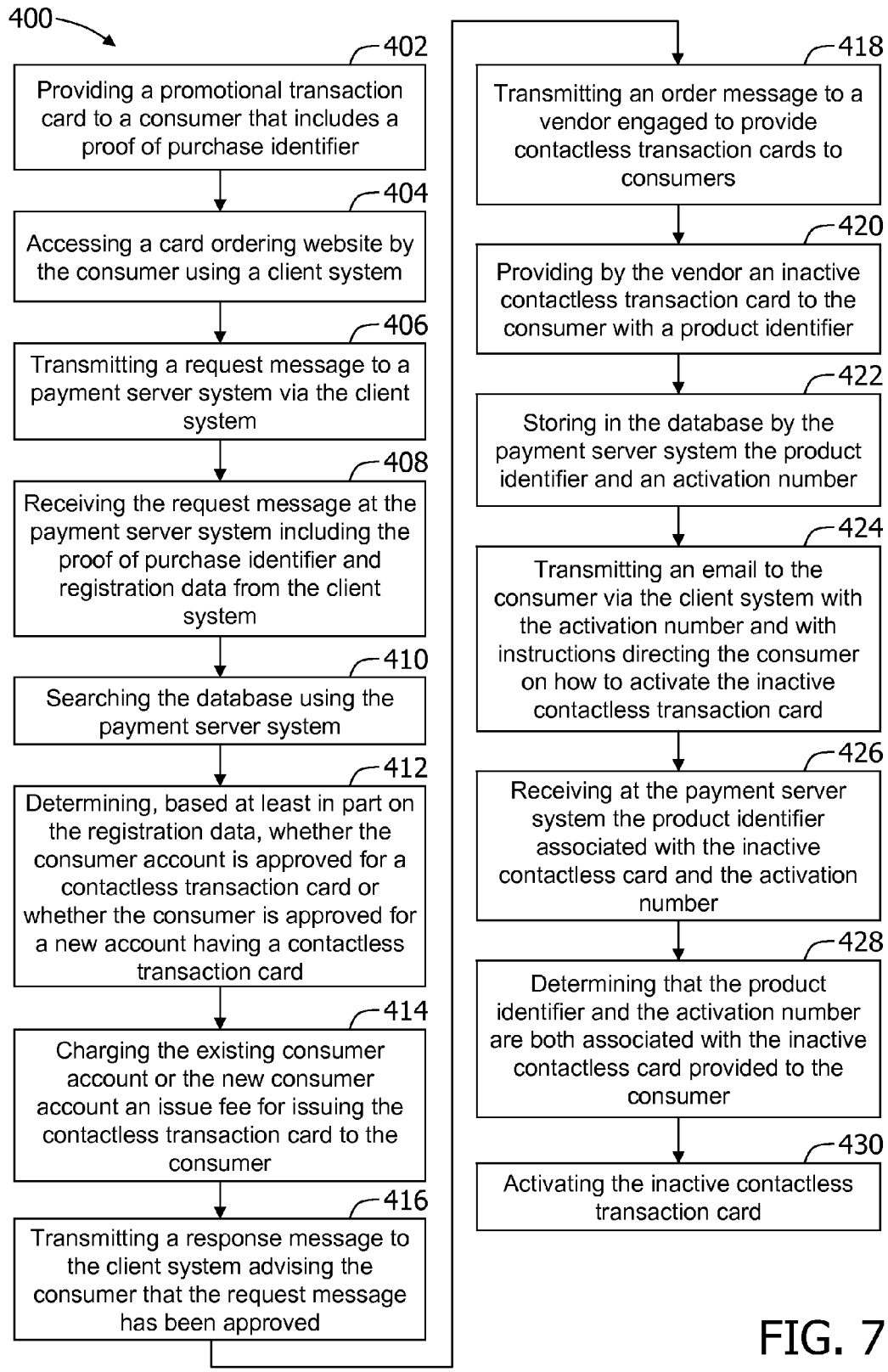

FIG. 7 is a flow chart showing an exemplary process 400 of issuing and activating a contactless transaction card using the payment card system shown in FIGS. 3 and 4, in accordance with one embodiment of the present invention. Process 400 includes the step of providing 402 a promotional transaction card to a consumer. The promotional card includes a proof of purchase identifier and information relating to a card ordering website for ordering a contactless transaction card. The information is essentially instructions directed to the consumer for placing an order for a contactless transaction card including a URL address for a card ordering website. For example, the promotional card could include a piece of paper enclosed within an envelope with the proof of purchase identifier and the instructions printed on the paper for instructing the consumer on accessing a website or telephone number after purchasing the promotional card. In addition, in this embodiment, a second proof of purchase identifier could also be provided at the point the consumer purchases the promotional card.

In another embodiment, the promotional card is electronically provided to the consumer. For example, the promotional card could be an email, an electronic file, or a link on a website communicated to the consumer wherein the email/file/website includes at least one of the proof of purchase identifier, instructions on how to order a contactless transaction card, and a link to a website for ordering a contactless transaction card. Thus, the promotional card could be electronically provided to a pre-approved consumer without being requested by the consumer.

After providing 402 the promotional card to the consumer, the consumer accesses 404 the card ordering website using client system 114 and transmits 406 a request message to payment server system 112 (shown in FIG. 3). The request message includes the proof of purchase identifier from the promotional card and registration data. In the example embodiment, the registration data includes information relating to an existing transaction card account assigned to the consumer including information such as an account number, an expiration date, a CVC2 code, a name, an address, a phone number, an email address, etc. Accordingly, in the example embodiment, before requesting a contactless transaction card, the consumer or cardholder would already have an existing transaction card account that uses payment card system 100. In another embodiment, the registration data would include data from the consumer for registering a new transaction card account that uses payment card system 100. In this other embodiment, the request message would also include a request to grant a new transaction account to the consumer.

Process 400 includes receiving 408, at payment server system 112, the request message including the proof of purchase identifier and the registration data from client system 114. Payment server system 112 searches 410 database 120, which is in communication with payment server system 112 to determine whether the proof of purchase identifier received by payment server system 112 is valid.

If the proof of purchase identifier received by payment server system 112 is determined to be valid, then payment server system 112 determines 412, based at least in part on the registration data, whether the consumer account is approved for a contactless transaction card or whether the consumer is approved for a new account having a contactless transaction card. Server system 112 will also verify that the consumer is associated with the consumer account.

When the existing consumer account is approved for a contactless transaction card or when the consumer is approved for a new account having a contactless transaction card, payment server system 112 charges 414 the existing consumer account or the new consumer account an issue fee for issuing the contactless transaction card to the consumer (unless the consumer already paid the issue fee at the point of purchasing the promotional card), and transmits 416 a response message to client system 114 advising the consumer that the request message has been approved and a contactless transaction card will be forwarded to the consumer within a predetermined period of time.

Payment server system 112 transmits 418 an order message to a vendor engaged to provide contactless transaction cards to consumers or to the issuer to provide the contactless cards. The order message includes the registration data provided by the consumer for programming the contactless transaction card. For example, the contactless transaction card must be programmed with certain account data such as cardholder name, account number, expiration date, a CVC2 code, an address, a phone number, an email address, etc. This account data is wirelessly transmitted from the contactless transaction card to the merchant's point-of-sale (POS) device when the contactless transaction card is positioned in close proximity to the POS device.

The vendor provides 420 an inactive contactless transaction card to the consumer with a product identifier. The inactive contactless transaction card is programmed by the vendor with the registration data of the consumer. The vendor provides the product identifier to payment server system 112. Payment server system 112 stores 422 the product identifier and an activation number in database 120. The activation number is for activating the inactive contactless transaction card. Payment server system 112 transmits 424 an email to the consumer via client system 114 with the activation number, and with instructions directing the consumer on how to activate the inactive contactless transaction card.

The consumer, following the instructions on how to activate the inactive card, accesses a website such as the card ordering website via client system 114, and enters the product identifier and the activation number. Payment server system 112 receives 426 the product identifier associated with the inactive contactless card and the activation number, and determines 428 by accessing database 120 that the product identifier and the activation number are both associated with the inactive contactless card provided to the consumer.

Upon payment server system 112 verifying the product identifier and the activation number for the contactless transaction card, payment server system 112 activates 430 the inactive contactless transaction card. The inactive contactless transaction card then becomes an active, contactless transaction card that can be used at merchant POS devices configured for processing such contactless transaction cards. Using the contactless transaction card, account data is communicated to POS device 115. The account data is combined with transaction data at POS device 115 to form an authorization request message, which is transmitted to payment server system 112 as part of the authorization process described hereinabove.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for issuing and activating a contactless transaction card using a server system coupled to a database, the server system in communication with a client computer system, said method comprising:

providing a promotional transaction card to a consumer, the promotional card including a proof of purchase identifier, the promotional transaction card not linked to an account usable for a financial transaction, the proof of purchase identifier indicating a proof of purchase of the promotional card;

receiving, at the server system, a request message from the client computer system for ordering a contactless transaction card for the consumer, the request message including the proof of purchase identifier and consumer registration data;

validating the request message;

issuing an inactive contactless transaction card to the consumer including a product identifier and an activation number associated with the contactless transaction card, the inactive contactless transaction card is associated with an existing transaction card account of the consumer and is a different card than the promotional transaction card;

storing the product identifier and the activation number in the database;

receiving, at the server system, the product identifier and the activation number from the client computer system for the inactive contactless transaction card; and activating the inactive contactless transaction card after the server system verifies that the received product identifier and activation number match the stored product identifier and activation number.

2. A computer-based method according to claim 1 wherein providing a promotional transaction card further comprises transmitting from the server system to the client computer system at least one of an email, an electronic file, or a link on a web page directing the consumer to a card ordering website for ordering the contactless transaction card.

3. A computer-based method according to claim 2 wherein the card ordering website prompts the consumer to input registration data, wherein registration data includes at least one of an account number, an expiration date, a CVC2 code, a name, an address, a phone number, an email address, for an existing transaction card account assigned to the consumer.

4. A computer-based method according to claim 1 wherein validating the request message further comprises:

storing in the database the proof of purchase identifier provided to the consumer on the promotional card;

comparing the received proof of purchase identifier to the stored proof of purchase identifier, the comparison performed by the server system; and validating the request message when the received proof of purchase identifier matches the stored proof of purchase identifier.

5. A computer-based method according to claim 4 wherein validating the request message further comprises:

determining, at least in part using the registration data, that an existing transaction card account assigned to the consumer is eligible for a contactless transaction card.

6. A computer-based method according to claim 1 wherein validating the request message further comprises:

automatically charging an issue fee to an existing transaction card account assigned to the consumer after confirming the consumer is approved for receiving the contactless transaction card account.

7. A computer-based method according to claim 1 wherein issuing an inactive contactless transaction card to the consumer further comprises:

providing the inactive contactless transaction card to the consumer, the inactive contactless transaction card is pre-programmed by a vendor engaged for providing inactive contactless transaction cards to consumers; and providing the activation number associated with the inactive contactless transaction card to the consumer, the activation number is provided by the server system, the activation number being unknown to the vendor.

8. A computer-based method according to claim 1 wherein issuing an inactive contactless transaction card to the consumer further comprises:

electronically transmitting an activation message from the server system to the client computer system, the activation message including the activation number for activating the inactive contactless transaction card, and instructions directing the consumer on how to activate the inactive contactless transaction card.

9. A computer-based method according to claim 1 further comprising incrementing an account of a respective issuer when a consumer purchases the promotional card, the account including at least a portion of the purchase price of the promotional cards purchased by consumers to at least partially offset costs incurred by the issuer when issuing the contactless cards.

10. A computer system for issuing and activating a contactless transaction card, the computer system comprising:

a database for storing data; and a computer device comprising a processor in communication with the database, the computer device programmed to:

transmit a promotional transaction card to a consumer via a consumer computer, the promotional card including a proof of purchase identifier, the promotional transaction card not linked to an account usable for a financial transaction, the proof of purchase identifier indicating a proof of purchase of the promotional card;

receive a request message from the consumer computer for ordering a contactless transaction card for the consumer, the contactless transaction card being associated with an existing transaction card account of the consumer and is a different card than the promotional transaction card and the request message including the proof of purchase identifier and consumer registration data;

validate the request message, wherein an inactive contactless transaction card including a product identifier is provided to the consumer after the request message is validated;

transmit an activation number associated with the inactive contactless transaction card to the consumer computer;

store the product identifier and the activation number in the database;

receive the product identifier and the activation number from the consumer computer; and activate the inactive contactless transaction card after verifying that the received product identifier and activation number match the stored product identifier and activation number.

11. A computer system according to claim 10, wherein said computer device is programmed to:

transmit a promotional transaction card to the consumer computer, wherein the promotional transaction card includes at least one of an email, an electronic file, or a link on a web page directing the consumer to a card ordering website for ordering the contactless transaction card.

12. A computer system according to claim 11, wherein said card ordering website prompts the consumer to input consumer registration data for inclusion with the request message, wherein the consumer registration data includes at least one of an account number, an expiration date, a CVC2 code, a name, an address, a phone number, an email address, for an existing transaction card account assigned to the consumer.

13. A computer system according to claim 10, wherein said computer device is programmed to:

store in the database the proof of purchase identifier provided to the consumer on the promotional card;

compare the received proof of purchase identifier to the stored proof of purchase identifier; and validate the request message when the received proof of purchase identifier matches the stored proof of purchase identifier.

14. A computer system according to claim 13, wherein said computer device is programmed to determine, at least in part using the registration data, that an existing transaction card account assigned to the consumer is eligible for a contactless transaction card.

15. A computer system according to claim 10, wherein said computer device is programmed to:
automatically charge an issue fee to an existing transaction card account assigned to the consumer after confirming the consumer is approved for receiving the contactless transaction card.

16. A computer system according to claim 10, wherein said computer device is programmed to:
electronically transmit an activation message to the consumer computer, the activation message including the activation number for activating the inactive contactless transaction card, and instructions directing the consumer on how to activate the inactive contactless transaction card.

17. A computer system according to claim 10, wherein said computer device is programmed to credit an account of a respective issuer an amount that represents at least a portion of the purchase price of a promotional card purchased by consumers, the account used by the issuer to at least partially offset an expense of providing the contactless cards to the consumers.

18. A computer system for issuing and activating a contactless transaction card, the computer system comprising:
a database for storing data; and
a computer device comprising a processor in communication with the database, the computer device programmed to:
receive a request message from a consumer computer for ordering a contactless transaction card, the request message including a proof of purchase identifier and consumer registration data, the proof of purchase identifier indicating a proof of purchase of the promotional card;
validate the request message, wherein an inactive contactless transaction card is associated with an existing transaction card account of the consumer and includes a product identifier is provided to the consumer upon validation;
transmit an activation number associated with the inactive contactless transaction card to the consumer computer;
store the product identifier and the activation number in the database;
receive the product identifier and the activation number from the consumer computer; and
activate the inactive contactless transaction card after verifying that the received product identifier and activation number match the stored product identifier and activation number.

19. One or more non-transitory computer-readable media having computer-executable instructions embodied thereon, wherein when executed by a computer device, the computer-executable instructions cause the computer device to:
transmit a promotional transaction card to a consumer via a consumer computer, the promotional card including a proof of purchase identifier, the promotional transaction card not linked to an account usable for a financial transaction;
receive a request message from the consumer computer for ordering a contactless transaction card for the consumer, the contactless transaction card being a different card than the promotional transaction card and the request message including the proof of purchase identifier and consumer registration data;
validate the request message, wherein an inactive contactless transaction card including a product identifier is provided to the consumer after the request message is validated, the inactive contactless transaction card is associated with an existing transaction card account of the consumer;
transmit an activation number associated with the inactive contactless transaction card to the consumer;
store the product identifier and the activation number in a memory device;
receive the product identifier and the activation number from the consumer computer; and
activate the inactive contactless transaction card after verifying that the received product identifier and activation number match the stored product identifier and activation number.

20. One or more non-transitory computer-readable media according to claim 19, wherein when executed by the computer device, the computer-executable instructions further cause the computer device to transmit a promotional transaction card to the consumer computer, wherein the promotional transaction card includes at least one of an email, an electronic file, and a link on a web page directing the consumer to a card ordering website for ordering the contactless transaction card.

21. One or more non-transitory computer-readable media according to claim 19, wherein when executed by the computer device, the computer-executable instructions further cause the computer device to:
store in the memory device the proof of purchase identifier provided to the consumer on the promotional card;
compare the received proof of purchase identifier to the stored proof of purchase identifier; and
validate the request message when the received proof of purchase identifier matches the stored proof of purchase identifier.

22. One or more non-transitory computer-readable media according to claim 19, wherein when executed by the computer device, the computer-executable instructions further cause the computer device to:
automatically charge an issue fee to an existing transaction card account assigned to the consumer after confirming the consumer is approved for receiving the contactless transaction card; and
electronically transmit an activation message to the consumer computer, the activation message including the activation number for activating the inactive contactless transaction card, and instructions directing the consumer on how to activate the inactive contactless transaction card.

23. One or more non-transitory computer-readable media according to claim 19, wherein when executed by the computer device, the computer-executable instructions further cause the computer device to:
receive an indication of a purchase of a promotional card by a consumer;
credit an account of an issuer associated with the purchased promotional card, the account usable to at least partially offset a cost to the issuer of providing a contactless card to the consumer.

* * * * *